United States Patent Office 3,798,173
Patented Mar. 19, 1974

3,798,173
PRODUCT AND PROCESS FOR EUROPIUM-ACTIVATED RARE EARTH PHOSPHOR
Dilip K. Nath, Euclid, and John R. Wolk, North Olmsted, Ohio, assignors to General Electric Company
Filed June 3, 1971, Ser. No. 149,456
Int. Cl. C09k 1/10, 1/54
U.S. Cl. 252—301.4 F                     9 Claims

ABSTRACT OF THE DISCLOSURE

Europium oxide activated rare earth phosphors are prepared having improved physical properties including uniform particle size of the phosphor crystals, brighter emission, and less electrical conductivity than can be obtained by conventional methods of preparation. The phosphor crystals are grown in the presence of a vitreous flux composition which is an alkali borosilicate material having a vitreous phase. The vitreous flux can be formed in situ by mixing the constituent materials with the rare earth oxides and heating the mixture to the firing temperature at which the phosphor crystals are formed or a preformed vitreous flux can be mixed with the rare earth oxides and the same firing schedule carried out. The final product can contain up to 15 weight percent vitreous flux in the luminescent material for optimum performance and said vitreous flux forms a coating on the phosphor crystals.

BACKGROUND OF THE INVENTION

The present invention deals with a new class of luminescent materials and a method by which said luminescent materials can be prepared having improved utilization characteristics.

Various europium-activated rare earth oxide phosphors have long been known as efficient red light emitting substances when excited by cathode rays, X-rays or ultraviolet light. In the conventional method of preparing such phosphors, a fluxing agent is added to the phosphor composition to lower the temperature at which the phosphor crystals are formed to facilitate preparation of a more acceptable final product. In one known method of preparation, alkaline earth halides are employed as the fluxing agent to control particle size of the phosphor crystals having acceptable luminescent properties. In a different method of preparation, an alkali metal oxide is employed to grow crystals of a europium-activated rare earth phosphor and enhance selected growth of a desired crystalline phase in the phosphor product. The known methods are deficient in requiring removal of the fluxing agent to avoid higher than tolerable electrical conductivity of the final product and ordinarily provide a phosphor having an excessive variation in particle size of the phosphor crystals which must be further processed to remove material not in conformity with size specifications.

SUMMARY OF THE INVENTION

It has now been discovered that europium oxide activated rare earth phosphors can be prepared readily with uniform particle size, brighter emission and reduced electrical conductivity without removing the fluxing agent.

The method of preparation herein employed utilizes a vitreous flux having an alkali borosilicate composition which does not contribute to higher electrical conduction of the final phosphor product and which further permits preparation of the phosphor at lower firing temperatures than employed when conventional fluxing agents are used. The present phosphors can be prepared by firing a mixture of the rare earth oxides to serve as the host material and activator either in the form of oxides or compounds of the rare earth metals which can be decomposed to form the oxides. The cathode ray efficiency of the present phosphors has been found superior to phosphor prepared with conventional fluxing agents and the proportion of the vitreous flux compositions in the present phosphors can be varied over a wide range to control the particle size, electrical conductivity and brightness of the phosphors as well as temperature of preparation, amount of oversize and elimination of attack upon container materials employed to prepare these type materials.

It is an object of the present invention, therefore, to provide an improved method of making a luminescent material which comprises europium-activated phosphor crystals of a rare earth oxide selected from the group consisting of yttrium oxide, gadolinium oxide and lanthanum oxide and solid solutions of these rare earth oxides which are more efficient under excitation by cathode rays compared with such phosphors prepared by conventional method of preparation.

Still another important object of the invention is to provide a method of preparing an europium oxide activated rare earth oxide phosphor by a process which is simple to control.

Still a further important object of the present invention is to prepare a europium oxide activated rare earth oxide phosphor having a uniform desired particle size useful in fabricating cathode ray tube screens.

Briefly stated, the present invention provides a new class of luminescent materials which comprises individual phosphor crystals having the following chemical composition

wherein Ln is a rare earth ion selected from the group consisting of yttrium, gadolinium and lanthanum and $x$ varies from a small but effective amount to activate the phosphor up to 10 mole percent, and which contains an alkaline metal borosilicate vitreous flux uniformly dispersed with said phosphor crystals which is the heat reaction product between an alkali metal oxide, boron oxide and silicon dioxide in the molar ratio range from 0.1–1.0. By "vitreous flux" is meant a material having one or more glass phases and which can contain one or more crystalline phases in equilibrium with the glass portion of the material. Preferred luminescent materials of the present invention contain 0.5–10 mole percent europium oxide in the composition and a weight ratio of the vitreous flux in the composition ranging from 0.1–15 weight percent. Optimum physical properties are obtained for the luminescent material by using an alkali borosilicate flux wherein the alkali metal oxide is selected from the group consisting of lithium oxide, sodium oxide and potassium oxide having a molar ratio range in the alkali borosilicate composition between 0.5–1.0.

The general method of preparing luminescent materials of the present invention comprises:

(a) Blending a mixture of rare earth oxides having the following chemical composition

wherein Ln is a rare earth ion selected from the group consisting of yttrium, gadolinium and lanthanum and $x$ varies from a small but effective amount to activate the phosphor up to 10 mole percent, with a flux composition containing an alkali metal oxide, boron oxide and silicon dioxide in the molar ratio range from 0.1–1.0, and (b) Firing the blended product in the temperature range 900° C.–1450° C. for a sufficient time period to form the phosphor crystals having uniformly dispersed therein a vitreous flux of alkali metal borosilicate.

Growth of the phosphor crystals in said alkali metal borosilicate flux during the firing schedule provides a median particle size between 5 and 25 microns diameter.

The median particle size was measured by an ultrasonic Coulter Counter method which counts and sizes the measured particles by a well-known technique. The vitreous flux can either be formed from the above-recited strating materials in situ as a heat reaction product during the same firing schedule employed to prepare the phosphor crystals or a preformed vitreous flux can be prepared and mixed with the rare earth oxide mixture which can then be subjected to the same firing schedule.

Unless otherwise specified, percentages and proportions recited in the following preferred embodiments are given in molar quantities.

DESCRIPTION OF THE PREFERRED EMBODIMENTS

Figure 1:
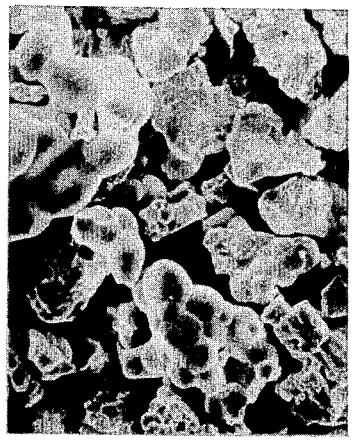
FIG. 1 is a photograph depicting highly magnified phosphor crystals prepared in accordance with the present invention.
Figure 2:
FIG. 2 is a different photograph taken at lesser magnification of the luminescent material depicted in FIG. 1.

Starting materials for the rare earth oxide constituents may consist of the oxides directly or any salts of a rare earth ion which can be decomposed to form the oxides or converted into oxides by such conventional techniques as chemical reaction or the like. Thus, it is contemplated to employ starting materials in the form of homogeneous mixtures or coprecipitated slurries of rare earth metal salts such as oxalates from which the rare earth oxides are prepared. The vitreous flux can also be prepared from a variety of starting materials such as a mixture of alkali metal, boron and silicon compounds which will ultimately produce the alkali metal oxide, boron oxide and silicon dioxide. It is further contemplated to employ a mixture of alkali metal oxides together with boron oxide and silicon dioxide in the molar proportions hereinbefore recited to form the desired vitreous flux material. In a preferred process, the starting materials containing rare earth oxide sources and alkali metal borosilicate sources are blended together to form a homogeneous mixture which is then fired in a suitable container at a temperature in the range 900° C.–1450° C. for a period between 1–20 hours. A preformed vitreous flux can be prepared by heating the starting materials at a temperature above 500° C. for a suitable period of time to form an alkali metal borosilicate having a vitreous phase. For example, a suitable vitreous flux was prepared by heating the starting materials at 700° C. for a six-hour time period. Depending on the temperature and time of heating during the preformation process, the alkali metal borosilicate flux may form a final structure which is either predominantly crystalline or glassy. Both crystalline and glassy structures can be broken mechanically to fine powders which can then be blended with the rare earth oxide materials and the blended product then fired in a suitable container at a temperature in the range 900° C.–1450° C. for a period between 1–20 hours. A lithium borosilicate flux was found to provide a glassy coating on the phosphor crystal particles having an appearance depicted in the accompanying drawings provided with this specification. More particularly, FIG. 1 represents an electron scanning microscope photograph taken at 3000 times magnification of red yttrium oxide phosphor coated with lithium borosilicate flux. FIG. 2 is a photograph taken by the same means of the same luminescent material photographed in FIG. 1 at 1000 times magnification to provide better indication of the uniform size distribution in a luminescent material prepared according to the invention. It can be further noted in both photographs that the coated phosphor crystals are devoid of sharp edges which could abrade other materials and thereby introduce deleterious foreign substances into the phosphor material. Electrical conductivity of luminescent materials prepared according to the present invention can be controlled in a range of 12–20 micromho and a neutral pH. The present method eliminates a washing operation which is normally employed after firing to reduce electrical conductivity of the final product. Oversize of the final luminescent material can also be controlled between 5–10 weight percent which is a higher yield value than is obtained by conventional methods of preparation.

The following examples are provided to illustrate in detail the practice of the present invention and the results obtained therewith.

EXAMPLE 1

A batch of 406.7 grams of yttrium oxide and 28.3 grams of europium oxide was dissolved by heating in 3000 ml. of dilute nitric acid containing 780 ml. of concentrated nitric acid and 2220 ml. of water. Instead of nitric acid, other suitable acids can be used in the right proportion to make the rare earth metal salt solution. 1510 grams of oxalic acid either in the form of solid or hot aqueous solution were added to the rare earth metal salt solution to coprecipitate yttrium and europium oxalates. The precipitate was washed with hot distilled water and dried at 130° C.–140° C. for six hours. A batch of 1000 grams of this oxalate precipitate was blended dry with 5 grams of preformed $Li_2O \cdot B_2O_3 \cdot SiO_2$ flux. The dry-blended material was transferred to an open silica tray and fired in a furnace at 1150° C. for five hours. The resultant 430 grams of yttrium oxide europium oxide phosphor has the chemical formula $(Y_{0.955}Eu_{0.045})_2O_3$ so that on the basis of the rare earth oxide weight there is present approximately 1.16 weight percent of the flux

$Li_2O \cdot B_2O_3 \cdot SiO_2$

The material was milled in a Bauer mill and sifted through a 325 mesh screen. The oversize fraction was found to be 5% which corresponds to a 95% yield of the starting rare earth oxide material. A portion of the sifted yttrium oxide europium oxide phosphor was washed four times with hot distilled water. The median particle size of the washed and unwashed phosphors was 9.5 microns.

For comparison, another batch of 1000 grams of dried yttrium-europium oxalate precipitate was fired at 1350° C. for six hours without any flux. The median particle size of this unfluxed europium oxide activated yttrium oxide phosphor having the chemical formula

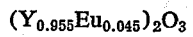
$(Y_{0.955}Eu_{0.045})_2O_3$ was 4.0 microns. This material had a large proportion of fines and a wide range of particle size distribution whereas the lithium borosilicate fluxed material had a very uniform size distribution. When examined under an optical microscope, the unfluxed material was found to be optically dark whereas the fluxed material was clear with dark boundaries showing the crystal growth phenomenon.

The cathode-ray efficiency was measured by comparing the brightness of these phosphors with that of a standard cathodoluminescent red-emitting europium-activated yttrium vanadate phosphor. Such a comparison showed that the brightness of the unfluxed $(Y_{0.955}Eu_{0.045})_2O_3$ phosphor was 145% to that of the standard europium-activated $YVO_4$ whereas both the unwashed and washed $(Y_{0.955}Eu_{0.045})_2O_3$ phosphors made by fluxing with lithium borosilicate were 186% bright. It is further to be pointed out that the unfluxed phosphor did not show any higher cathode-ray efficiency if fired at a temperature different than 1350° C.

EXAMPLE 2

Example 1 was repeated except that the flux concentration was reduced by 50%. In other words, 1000 grams of the dried oxalate precipitate of yttrium and europium were blended with 2.5 grams of the preformed

$Li_2O \cdot B_2O_3 \cdot SiO_2$ flux. The process for the preparation of the yttrium-europium oxide phosphor was then repeated as in Example 1. The unwashed and washed phosphors had the median particle size 6.8 microns and a brightness 171.

EXAMPLE 3

Example 2 was repeated except that the phosphor was prepared by heating at 1050° C. for six hours. The unwashed and washed phosphors had the median particle size 4.1 microns and a brightness 143.

EXAMPLE 4

1000 grams of dried oxalates of yttrium and europium made according to Example 1 were blended with 4.64 grams of lithium carbonate, 3.74 grams of silica and 7.74 grams of boric acid. The blend was otherwise processed as in Example 1. The median particle size and brightness of this phosphor were 11.4 microns and 185, respectively.

EXAMPLE 5

1000 grams of dried oxalates of yttrium and europium made according to Example 1 were blended with 2.96 grams of lithium carbonate, 2.98 grams of silica and 6.18 grams of boric acid. The blend was processed as in Example 1. The median particle size and brightness of this phosphor were 9.4 microns and 175, respectively.

EXAMPLE 6

1000 grams of dried oxalates of yttrium and europium made according to Example 1 were blended with 4.43 grams of lithium carbonate, 2.98 grams of silica and 6.18 grams of boric acid. The blend was processed as in Example 1. The median particle size and brightness of this phosphor were 10.6 microns and 185, respectively.

EXAMPLE 7

1000 grams of dried oxalates of yttrium and europium made according to Example 1 were blended with 3.69 grams of lithium carbonate, 2.98 grams of silica and 7.41 grams of boric acid. The blend was processed as in Example 1. The median particle size and brightness of this phosphor were 8.7 microns and 172, respectively.

EXAMPLE 8

1000 grams of dried oxalates of yttrium and europium made according to Example 1 were blended with 3.69 grams of lithium carbonate, 3.58 grams of silica and 6.18 grams of boric acid. The blend was processed as in Example 1. The median particle size and brightness of this phosphor were 9.4 microns and 172, respectively.

EXAMPLE 9

Example 1 was repeated except that 5 grams of $$Na_2O \cdot B_2O_3 \cdot 2SiO_2$$

were used as a flux instead of 5 grams of $Li_2O \cdot B_2O_3 \cdot SiO_2$. The resultant phosphor had a median particle size 7.4 microns and brightness 170.

EXAMPLE 10

Example 1 was repeated except that 5 grams of $$K_2O \cdot B_2O_3 \cdot 2SiO_2$$

were used as a flux instead of 5 grams of $Li_2O \cdot B_2O_3 \cdot SiO_2$. The resultant phosphor had a median particle size 6.2 microns and brightness 155.

EXAMPLE 11

A batch of 346.19 grams of gadolinium oxide and 15.84 grams of europium oxide was dissolved by heating in 390 ml. of concentrated nitric acid and 1000 ml. distilled water. 755 grams of oxalic acid either in the form of solid or hot aqueous solution were added to the rare earth metal salt solution to coprecipitate gadolinium and europium oxalates. The precipitate was washed with hot distilled water and dried at 130° C.–140° C. for six hours. 500 grams of the rare earth oxalate precipitate was blended dry with 2.5 grams of a preformed $Li_2O \cdot B_2O_3 \cdot SiO_2$ flux. The dry-blended material was heated in an open silica tray at 1150° C. for five hours. The phosphor was cooled, ground and sifted through a 325-mesh screen. The median particle size and brightness of the sifted phosphor were 10.1 microns and 165, respectively.

EXAMPLE 12

A batch of 202.09 grams of yttrium oxide, 19.54 grams of lanthanum oxide and 15.84 grams of europium oxide was dissolved by heating in 390 ml. concentrated nitric acid and 1000 ml. distilled water. The phosphor was then prepared in the same way as in Example 11. The median particle size and brightness of this phosphor were 17 microns and 160, respectively.

EXAMPLE 13

A batch of 173.09 grams of gadolinium oxide, 107.82 grams of yttrium oxide and 15.84 grams of europium oxide was processed in the same way as in Example 12. The median particle size and brightness of this phosphor were 16 microns and 165, respectively.

EXAMPLE 14

A batch of 159.50 grams of gandolinium oxide, 99.36 grams of yttrium oxide, 24.44 grams of lanthanum oxide and 15.84 grams of europium oxide was processed in the same way as in Example 12. The median particle size and brightness of this phosphor were 17.2 microns and 160, respectively.

It will be apparent from the foregoing description that a new class of luminescent materials has been provided along with a novel method for their preparation which provides various advantages. It should also be appreciated from the foregoing description that luminescent materials of the present invention can be prepared from different starting materials than herein disclosed, so it is intended to limit the present invention, therefore, only to the scope of the following claims.

What we claim as new and desire to secure by Letters Patent of the United States is:

1. A luminescent material consisting essentially of
   (a) individual phosphor crystals having the following chemical composition:

$$(Ln_{1-x}Eu_x)_2O_3$$

wherein Ln is a rare earth ion selected from the group consisting of yttrium, gadolinium and lanthanum and $x$ varies from a small but effective amount to activate the phosphor up to 10 mol percent, and which contains
   (b) an alkali metal borosilicate vitreous flux uniformly dispersed with said phosphor crystals which is the heat reaction product between an alkali metal oxide, boron oxide and silicon dioxide in the molar ratio range from 0.1–1.0, wherein the weight ratio of the vitreous flux is from 0.1 to 15 weight percent of the luminescent material, said vitreous flux forming a coating on said phopshor crystals.
2. A luminescent material as in claim 1 wherein the vitreous flux contains a mixture of alkali metal oxides.
3. A method of preparing a luminescent material which comprises:
   (a) blending a mixture of rare earth oxides having the following chemical composition:

$$(Ln_{1-x}Eu_x)_2O_3$$

wherein Ln is a rare earth ion selected from the group consisting of yttrium, gadolinium, and lanthanum- and $x$ varies from a small but effective amount to activate the phosphor up to 10 mol percent, with a flux composition consisting of an alkali metal oxide, boron oxide and silicon dioxide in the molar ratio range 0.1–1.0 wherein the weight ratio of the vitreous flux is from 0.1 to 15 weight percent of the blended product, and (b) firing the blended product in the temperature range 900° C.–1450° C. for a sufficient time period to form the phosphor crystals having uniformly dispersed therein a vitreous flux of alkali metal borosilicate, said vitreous flux forming a coating on said phosphor crystals.

4. A method as in claim 3 wherein the vitreous flux is preformed by heating the flux composition at a temperature of at least 500° C. for a sufficient time period to form a heat reaction product containing vitreous phase and blending said vitreous flux with the mixture of rare earth oxides.

5. A method as in claim 4 wherein said vitreous flux has been ground before blending with the mixed rare earth oxides.

6. A method of preparing a luminescent material having a chemical composition which comprises europium-activated phosphor crystals of a rare earth oxide selected from the group consisting of yttrium oxide, gadolinium oxide, lanthanum oxide, and solid solutions of said rare earth oxides, comprising:
(a) dissolving a mixture containing 90–99.5 mol percent rare earth oxide in 0.5–10 mol percent europium oxide in an acid and in coprecipitating and coprecipitating the mixture as oxalates,
(b) drying the coprecipitating oxalates and mixing the dried coprecipitate with 0.1–15 weight percent of a flux composition consisting of an alkali metal oxide boron oxide and silicon dioxide in the molar ratio range from 0.1–1.0, and
(c) firing the blended product between 900° C.–1450° C. for a sufficient time period to form the phosphor crystals having uniformly dispersed therein in vitreous flux of alkali metal borosilicate, said vitreous flux forming a coating on said phosphor crystals.

7. A method of preparing a luminescent material having a chemical composition which comprises europium-activated phosphor crystals of a rare earth oxide selected from the group consisting of yttrium oxide, gadolinium oxide, lanthanum oxide and solid solutionss of said rare earth oxides, comprising:
(a) dissolving a mixture containing 90–99.5 mol percent of the rare earth oxides with 0.5–10 mol percent europium oxide in an acid and coprecipitating the mixture as oxalates,
(b) decomposing the coprecipitated oxalates to oxides by heating to a temperature of at least 900° C. and blending the rare earth oxide product with 0.1–15 weight percent of a flux composition containing an alkali metal oxide, boron oxide and silicon dioxide in the molar ratio range from 0.1 to 1.0, and
(c) firing the blended product at a temperature range 900° C.–1450° C. for a sufficient period to form the phosphor crystals having uniformly dispersed therein a vitreous flux of alkali metal borosilicate, said vitreous flux forming a coating on said phosphor crystals.

8. A method of preparing a luminescent material as in claim 7 wherein the alkali metal oxide is selected from sodium oxide, lithium oxide and potassium oxide.

9. A method of preparing a luminescent material having a chemical composition which comprises europium-activated phosphor crystals of a rare earth oxide selected from the group consisting of yttrium oxide, gadolinium oxide, lanthanum oxide and solid solutionss of said rare earth oxides, comprising:
(a) dissolving a mixture containing 90–99.5 mole percent of the rare earth oxide with 0.5–10 mole percent europium oxide in an acid followed by coprecipitating the mixture as oxalates,
(b) drying the coprecipitated mixture and blending approximately 0.3 weight percent of a lithium borosilicate flux composition in said mixture,
(c) firing the blended product at a temperature range between 900° C. and 1450° C. for a time period ranging between 1 hour to 36 hours, and
(d) cooling, washing and drying the washed product to form the luminescent material.

References Cited
UNITED STATES PATENTS

| | | | |
|---|---|---|---|
| 3,368,980 | 2/1968 | Avella et al. | 252—301.4 R |
| 3,457,184 | 7/1969 | Kobayashi et al. | 252—301.4 R |
| 3,458,450 | 7/1969 | Kobayashi et al. | 252—301.4 R |
| 3,562,175 | 2/1971 | Hickok | 252—301.4 R |
| 3,650,975 | 3/1972 | Yale | 252—301.4 F |

OSCAR R. VERTIZ, Primary Examiner

J. COOPER, Assistant Examiner

U.S. Cl. X.R.

252—301.4 R